United States Patent
Kishiyama et al.

(10) Patent No.: US 10,009,875 B2
(45) Date of Patent: Jun. 26, 2018

(54) MOBILE TERMINAL APPARATUS AND RADIO COMMUNICATION METHOD

(75) Inventors: Yoshihisa Kishiyama, Tokyo (JP); Kazuaki Takeda, Tokyo (JP)

(73) Assignee: NTT DOCOMO, INC., Tokyo (JP)

(*) Notice: Subject to any disclaimer, the term of this patent is extended or adjusted under 35 U.S.C. 154(b) by 471 days.

(21) Appl. No.: 13/816,743

(22) PCT Filed: Aug. 16, 2011

(86) PCT No.: PCT/JP2011/068548
§ 371 (c)(1),
(2), (4) Date: Mar. 11, 2013

(87) PCT Pub. No.: WO2012/023552
PCT Pub. Date: Feb. 23, 2012

(65) Prior Publication Data
US 2013/0176928 A1    Jul. 11, 2013

(30) Foreign Application Priority Data

Aug. 16, 2010  (JP) .................................. 2010-181944
Oct. 4, 2010   (JP) .................................. 2010-225117

(51) Int. Cl.
*H04W 4/00*     (2018.01)
*H04W 72/02*    (2009.01)
(Continued)

(52) U.S. Cl.
CPC ........... *H04W 72/02* (2013.01); *H04L 1/0026* (2013.01); *H04L 1/1861* (2013.01);
(Continued)

(58) Field of Classification Search
CPC ... H04L 1/1861; H04L 1/1893; H04L 1/0026; H04L 5/0057; H04L 5/0055; H04L 5/0005; H04L 1/007; H04W 72/02
(Continued)

(56) References Cited

U.S. PATENT DOCUMENTS

2010/0034312 A1   2/2010  Muharemovic et al.
2010/0272048 A1*  10/2010 Pan et al. ............... 370/329
(Continued)

OTHER PUBLICATIONS

Decision to Grant issued in Japanese Patent Application No. 2012-008647, dated Jan. 21, 2014, with English translation thereof (4 pages).
(Continued)

*Primary Examiner* — Kwang B Yao
*Assistant Examiner* — Harun Chowdhury
(74) *Attorney, Agent, or Firm* — Osha Liang LLP

(57) ABSTRACT

The present invention is directed to efficiently transmitting feedback control information in a physical uplink control channel in a communication system having a system band formed with a plurality of fundamental frequency blocks. The present invention has a demodulation section that demodulates downlink shared channel signals for each of a plurality of fundamental frequency blocks, a detection section that detects the state of a retransmission acknowledgement signal of each of the plurality of fundamental frequency blocks based on the demodulated downlink shared channel signals, and an uplink control channel processing section that maps the retransmission acknowledgement signals of the plurality of fundamental frequency blocks to an uplink control channel of a specific fundamental frequency block that is selected from the plurality of fundamental frequency blocks, and the uplink control channel processing section selects a plurality of allocated resources from the uplink control channel, and defines the states of the retransmission acknowledgement signals of the plurality of fundamental frequency blocks by bit information by phase shift modulation and channel selection information.

4 Claims, 14 Drawing Sheets

(51) Int. Cl.
  *H04L 1/18* (2006.01)
  *H04L 1/00* (2006.01)
  *H04L 5/00* (2006.01)
(52) U.S. Cl.
  CPC .......... *H04L 1/1893* (2013.01); *H04L 5/0055* (2013.01); *H04L 5/0057* (2013.01)
(58) Field of Classification Search
  USPC .................. 370/311, 328, 329, 280, 341
  See application file for complete search history.

(56) References Cited

U.S. PATENT DOCUMENTS

| | | | |
|---|---|---|---|
| 2011/0243066 A1* | 10/2011 | Nayeb Nazar .......... | H04L 1/007 370/328 |
| 2011/0268001 A1* | 11/2011 | Lee et al. ................ | 370/311 |
| 2012/0044871 A1* | 2/2012 | Li et al. ................... | 370/328 |

OTHER PUBLICATIONS

International Search Report issued in PCT/JP2011/068548 dated Sep. 13, 2011 (4 pages).
3GPP TR 25.912 V7.1.0; "3rd Generation Partnership Project; Technical Specification Group Radio Access Network; Feasibility study for evolved Universal Terrestrial Radio Access (UTRA) and Universal Terrestrial Radio Access Network (UTRAN) (Release 7)"; Sep. 2006 (57 pages).
ZTE, "Uplink Control Channel Design for LTE-Advanced", TSG-RAN WG1 #57, R1-091702, San Francisco, USA, May 4-8, 2009 (6 pages).
CATT, "UL ACK/NACK Transmission Design in FDD with CA", 3GPP TSG RAN WG1 Meeting #60, R1-100876, San Francisco, USA, Feb. 22-26, 2010 (5 pages).
Huawei, "UL ACK/NACK Design for Carrier Aggregation—payload and format", 3GPP TSG RAN WG1 Meeting #60bis, R1-101942, Beijing, China, Apr. 12-16, 2010 (5 pages).
Huawei, "A/N Codebook Design with DTX for Carrier Aggregation", 3GPP TSG RAN WG1 Meeting #61, R1-103088, Montreal, Canada, May 10-14, 2010 (11 pages).
Office Action for Japanese Application No. 2010-225117 dated Sep. 13, 2012, with English translation thereof (7 pages).
Extended Search Report issued in corresponding European Application No. 11818193.2, dated Jun. 29, 2015 (5 pages).
Panasonic; "ACK/NACK multiplexing schemes on PUCCH", 3GPP TSG RAN WG1 Meeting #61bis, R1-103751, Dresden, Germany, Jun. 28-Jul. 2, 2010 (4 pages).
ZTE; "Methods for ACK/NACK multiplexing", 3GPP TSG-RAN WG1 Meeting #61, R1-102907, Montreal, Canada, May 10-14, 2010 (8 pages).
Office Action issued in corresponding Taiwanese Application No. 100129205, dated Oct. 15, 2013 (6 pages).
Office Action issued in corresponding Canadian Application No. 2,807,539, dated Feb. 8, 2017 (5 pages).

* cited by examiner

FORMAT 1A
(W/O SPATIAL MULTIPLEXING)

|     | Ch1 |
| --- | --- |
| DTX | 0   |
| N   | 1   |
| A   | −1  |

A : ACK
N : NACK

FIG. 4A

FORMAT 1B
(W/ SPATIAL MULTIPLEXING)

|      | Ch1 |
| ---- | --- |
| DTX  | 0   |
| N, N | 1   |
| N, A | −j  |
| A, N | j   |
| A, A | −1  |

A : ACK
N : NACK

FIG. 4B

FIG. 5A (W/O SPATIAL MULTIPLEXING)

| PCC | SCC | Ch1 | Ch2 |
|---|---|---|---|
| DTX | DTX | 0 | 0 |
| N | DTX | 1 | 0 |
| A | DTX | -1 | 0 |
| DTX | N | j | 0 |
| N | N | 1 | 0 |
| A | N | -1 | 0 |
| DTX | A | 0 | j |
| N | A | 0 | 1 |
| A | A | 0 | -1 |

EXPLICIT DTX SIGNALING FOR PCC

FIG. 5B (W/ SPATIAL MULTIPLEXING)

| PCC | SCC | Ch1 | Ch2 |
|---|---|---|---|
| DTX | DTX | 0 | 0 |
| N, N | DTX | 1 | 0 |
| N, A | DTX | -j | 0 |
| A, N | DTX | j | 0 |
| A, A | DTX | -1 | 0 |
| DTX | N, N | 1 | 0 |
| N, N | N, N | 1 | 0 |
| N, A | N, N | -j | 0 |
| A, N | N, N | j | 0 |
| A, A | N, N | -1 | 0 |
| DTX | N, A | 1 | 0 |
| N, N | N, A | 1 | 0 |
| N, A | N, A | -j | 0 |
| A, N | N, A | j | 0 |
| A, A | N, A | -1 | 0 |
| DTX | A, N | 1 | 0 |
| N, N | A, N | 1 | 0 |
| N, A | A, N | -j | 0 |
| A, N | A, N | j | 0 |
| A, A | A, N | -1 | 0 |
| DTX | A, A | 0 | 1 |
| N, N | A, A | 0 | 1 |
| N, A | A, A | 0 | -j |
| A, N | A, A | 0 | j |
| A, A | A, A | 0 | -1 |

NO EXPLICIT DTX SIGNALING FOR PCC

SPATIAL BUNDING FOR SCC

FIG. 6A (W/O SPATIAL MULTIPLEXING)

| PCC | SCC | Ch1 | Ch2 | Ch3 | Ch4 |
|---|---|---|---|---|---|
| DTX | DTX | 0 | 0 | 0 | 0 |
| N | DTX | 1 | 0 | 0 | 0 |
| A | DTX | −1 | 0 | 0 | 0 |
| DTX | N | 0 | j | 0 | 0 |
| N | N | 0 | 1 | 0 | 0 |
| A | N | 0 | −1 | 0 | 0 |
| DTX | A | 0 | 0 | j | 0 |
| N | A | 0 | 0 | 1 | 0 |
| A | A | 0 | 0 | −1 | 0 |

EXPLICIT DTX SIGNALING FOR PCC AND SCC — NOT USED

FIG. 6B (W/ SPATIAL MULTIPLEXING)

| PCC | SCC | Ch1 | Ch2 | Ch3 | Ch4 |
|---|---|---|---|---|---|
| DTX | DTX | 0 | 0 | 0 | 0 |
| N, N | DTX | 1 | 0 | 0 | 0 |
| N, A | DTX | −j | 0 | 0 | 0 |
| A, N | DTX | j | 0 | 0 | 0 |
| A, A | DTX | −1 | 0 | 0 | 0 |
| DTX | N, N | 1 | 0 | 0 | 0 |
| N, N | N, N | 1 | 0 | 0 | 0 |
| N, A | N, N | −j | 0 | 0 | 0 |
| A, N | N, N | j | 0 | 0 | 0 |
| A, A | N, N | −1 | 0 | 0 | 0 |
| DTX | N, A | 0 | 1 | 0 | 0 |
| N, N | N, A | 0 | 1 | 0 | 0 |
| N, A | N, A | 0 | −j | 0 | 0 |
| A, N | N, A | 0 | j | 0 | 0 |
| A, A | N, A | 0 | −1 | 0 | 0 |
| DTX | A, N | 0 | 0 | 1 | 0 |
| N, N | A, N | 0 | 0 | 1 | 0 |
| N, A | A, N | 0 | 0 | −j | 0 |
| A, N | A, N | 0 | 0 | j | 0 |
| A, A | A, N | 0 | 0 | −1 | 0 |
| DTX | A, A | 0 | 0 | 0 | 1 |
| N, N | A, A | 0 | 0 | 0 | 1 |
| N, A | A, A | 0 | 0 | 0 | −j |
| A, N | A, A | 0 | 0 | 0 | j |
| A, A | A, A | 0 | 0 | 0 | −1 |

NO EXPLICIT DTX SIGNALING FOR PCC

TABLE WHEN PCC IS RANK 1 (OR DTX)

| PCC | SCC | Ch1 | Ch2 |
|---|---|---|---|
| DTX | DTX | 0 | 0 |
| N | DTX | 1 | 0 |
| A | DTX | −1 | 0 |
| DTX | N/N, N/N, A/A, N | 0 | 1 |
| N | N/N, N/N, A/A, N | −j | 0 |
| A | N/N, N/N, A/A, N | j | 0 |
| DTX | A/A, A | 0 | −1 |
| N | A/A, A | 0 | −j |
| A | A/A, A | 0 | j |

FIG. 7A

TABLE WHEN PCC IS RANK 2

| PCC | SCC | Ch1 | Ch2 |
|---|---|---|---|
| N, N | DTX/N/N, N/N, A/A, N | 1 | 0 |
| N, A | DTX/N/N, N/N, A/A, N | −j | 0 |
| A, N | DTX/N/N, N/N, A/A, N | j | 0 |
| A, A | DTX/N/N, N/N, A/A, N | −1 | 0 |
| N, N/N, A/A, N | A/A, A | 0 | −j |
| A, A | A/A, A | 0 | j |

TABLE WHEN PCC IS RANK 1 (OR DTX)

| PCC | SCC | Ch1 | Ch2 | Ch3 | Ch4 |
|---|---|---|---|---|---|
| DTX | DTX | 0 | 0 | 0 | 0 |
| N | DTX | 1 | 0 | 0 | 0 |
| A | DTX | −1 | 0 | 0 | 0 |
| DTX | N/N, N | 0 | 1 | 0 | 0 |
| N | N/N, N | −j | 0 | 0 | 0 |
| A | N/N, N | j | 0 | 0 | 0 |
| DTX | N, A | 0 | 0 | 1 | 0 |
| N | N, A | 0 | 0 | −j | 0 |
| A | N, A | 0 | 0 | j | 0 |
| DTX | A, N | 0 | 0 | 0 | 1 |
| N | A, N | 0 | 0 | 0 | −j |
| A | A, N | 0 | 0 | 0 | j |
| DTX | A/A, A | 0 | −1 | 0 | 0 |
| N | A/A, A | 0 | −j | 0 | 0 |
| A | A/A, A | 0 | j | 0 | 0 |

FIG. 8B

TABLE WHEN PCC IS RANK 2

| PCC | SCC | Ch1 | Ch2 | Ch3 | Ch4 |
|---|---|---|---|---|---|
| N, N | DTX/N/N, N | 1 | 0 | 0 | 0 |
| N, A | DTX/N/N, N | −j | 0 | 0 | 0 |
| A, N | DTX/N/N, N | j | 0 | 0 | 0 |
| A, A | DTX/N/N, N | −1 | 0 | 0 | 0 |
| N, N | N, A | 0 | 0 | 1 | 0 |
| N, A | N, A | 0 | 0 | −j | 0 |
| A, N | N, A | 0 | 0 | j | 0 |
| A, A | N, A | 0 | 0 | −1 | 0 |
| N, N | A, N | 0 | 0 | 0 | 1 |
| N, A | A, N | 0 | 0 | 0 | −j |
| A, N | A, N | 0 | 0 | 0 | j |
| A, A | A, N | 0 | 0 | 0 | −1 |
| N, N/N, A/A, N | A/A, A | 0 | −j | 0 | 0 |
| A, A | A/A, A | 0 | j | 0 | 0 |

| PCC | SCC | Ch1 | Ch2 |
|-----|-----|-----|-----|
| DTX | DTX | 0 | 0 |
| N | DTX | 1 | 0 |
| A | DTX | -1 | 0 |
| DTX | N | 0 | (1) |
| N | N | 1 | 0 |
| A | N | -1 | 0 |
| DTX | A | 0 | (-1) |
| N | A | j | 0 |
| A | A | 0 | j |

EXPLICIT DTX SIGNALING FOR PCC

FIG. 12

| PCC | SCC | Ch1 | Ch2 | Ch3 |
|---|---|---|---|---|
| DTX | DTX | 0 | 0 | 0 |
| N, N | DTX | 1 | 0 | 0 |
| N, A | DTX | -j | 0 | 0 |
| A, N | DTX | j | 0 | 0 |
| A, A | DTX | -1 | 0 | 0 |
| DTX | N | 0 | 1 | 0 |
| N, N | N | 0 | 1 | 0 |
| N, A | N | 0 | 0 | -j |
| A, N | N | 0 | 0 | j |
| A, A | N | 0 | 0 | -1 |
| DTX | A | 0 | -1 | 0 |
| N, N | A | 0 | -1 | 0 |
| N, A | A | 0 | -j | 0 |
| A, N | A | 0 | j | 0 |
| A, A | A | 0 | 0 | 1 |

FIG. 13A

| PCC | SCC | Ch1 | Ch2 | Ch3 |
|---|---|---|---|---|
| DTX | DTX | 0 | 0 | 0 |
| N | DTX | 1 | 0 | 0 |
| A | DTX | -1 | 0 | 0 |
| DTX | N, N | 0 | (0) | 0 |
| N | N, N | 1 | 0 | 0 |
| A | N, N | -1 | 0 | 0 |
| DTX | N, A | 0 | (-j) | 0 |
| N | N, A | 0 | 0 | -j |
| A | N, A | -j | 0 | 0 |
| DTX | A, N | 0 | (j) | 0 |
| N | A, N | 0 | 0 | j |
| A | A, N | j | 0 | 0 |
| DTX | A, A | 0 | (-1) | 0 |
| N | A, A | 0 | 0 | -1 |
| A | A, A | 0 | 0 | 1 |

EXPLICIT DTX SIGNALING FOR PCC

FIG. 13B

| PCC | SCC | Ch1 | Ch2 | Ch3 | Ch4 |
|---|---|---|---|---|---|
| DTX | DTX | 0 | 0 | 0 | 0 |
| N, N | DTX | 1 | 0 | 0 | 0 |
| N, A | DTX | -j | 0 | 0 | 0 |
| A, N | DTX | j | 0 | 0 | 0 |
| A, A | DTX | -1 | 0 | 0 | 0 |
| DTX | N, N | 0 | 0 | 0 | 0 |
| N, N | N, N | 1 | 0 | 0 | 0 |
| N, A | N, N | -j | 0 | 0 | 0 |
| A, N | N, N | j | 0 | 0 | 0 |
| A, A | N, N | -1 | 0 | 0 | 0 |
| DTX | N, A | 0 | -j | 0 | 0 |
| N, N | N, A | 0 | -j | 0 | 0 |
| N, A | N, A | 0 | 0 | -j | 0 |
| A, N | N, A | 0 | 0 | j | 0 |
| A, A | N, A | 0 | 0 | -1 | 0 |
| DTX | A, N | 0 | j | 0 | 0 |
| N, N | A, N | 0 | j | 0 | 0 |
| N, A | A, N | 0 | 0 | 0 | -j |
| A, N | A, N | 0 | 0 | 0 | j |
| A, A | A, N | 0 | 0 | 0 | -1 |
| DTX | A, A | 0 | -1 | 0 | 0 |
| N, N | A, A | 0 | -1 | 0 | 0 |
| N, A | A, A | 0 | 0 | 0 | 1 |
| A, N | A, A | 0 | 0 | 1 | 0 |
| A, A | A, A | 0 | 1 | 0 | 0 |

FIG. 14

MOBILE TERMINAL APPARATUS AND RADIO COMMUNICATION METHOD

TECHNICAL FIELD

The present invention relates to a mobile terminal apparatus and a radio communication method in a next generation mobile communication system.

BACKGROUND ART

In a UMTS (Universal Mobile Telecommunications System) network, for the purposes of improving frequency usage efficiency and improving the peak data rate, system features based on W-CDMA (Wideband Code Division Multiple Access) are maximized by adopting HSDPA (High Speed Downlink Packet Access) and HSUPA (High Speed Uplink Packet Access). For this UMTS network, for the purposes of further increasing frequency usage efficiency and the peak data rate, reducing delay and so on, long-term evolution (LTE) has been under study (non-patent literature 1). Unlike W-CDMA, LTE uses, as multiplexing schemes, OFDMA (Orthogonal Frequency Division Multiple Access) on downlink channels (downlink) and SC-FDMA (Single Carrier Frequency Division Multiple Access) on uplink channels (uplink).

As shown in FIG. 1, a signal to be transmitted on the uplink is mapped to an adequate radio resource and transmitted from a mobile terminal apparatus to a radio base station apparatus. In this case, user data (UE (User Equipment) #1 and UE #2) is allocated to the uplink shared channel (PUSCH: Physical Uplink Shared CHannel). Also, when control information is transmitted at the same time with user data, the control information is time-multiplexed on the PUSCH, and, when control information alone is transmitted, the control information is allocated to the uplink control channel (PUCCH: Physical Uplink Control CHannel). This control information to be transmitted on the uplink includes downlink quality information (CQI: Channel Quality Indicator), retransmission acknowledgement signals (ACK/NACK) for downlink shared channel (PDSCH: Physical Downlink Shared CHannel)) signals, and so on.

The PUCCH typically employs different subframe configurations when transmitting CQIs and when transmitting ACK/NACK (see FIG. 2A and FIG. 2B). The subframe configuration of the PUCCH includes seven SC-FDMA symbols in one slot (½ subframe). Also, one SC-FDMA symbol includes twelve information symbols (subcarriers). To be more specific, in the CQI subframe configuration (CQI format), as shown in FIG. 2A, a reference signal (RS) is multiplexed on the second symbol (#2) and the sixth symbol (#6) in a slot, and control information (CQI) is multiplexed on the other symbols (the first symbol (#1), the third symbol (#3) through the fifth symbol (#5), and the seventh symbol (#7)). Also, in the ACK/NACK subframe configuration (ACK/NACK format), as shown in FIG. 2B, a reference signal is multiplexed on the third symbol (#3) through the fifth symbol (#5) in a slot, and control information (ACK/NACK) is multiplexed on the other symbols (the first symbol (#1), the second symbol (#2), the sixth symbol (#6) and the seventh symbol (#7)). In one subframe, the above slot is repeated twice. Also, as shown in FIG. 1, the PUCCH is multiplexed on the radio resources at both ends of the system band, and frequency hopping (Inter-slot FH) is applied between the two slots having different frequency bands in one subframe.

CITATION LIST

Non-Patent Literature

Non-Patent Literature 1: 3GPP, TR 25.912 (V7.1.0), "Feasibility study for Evolved UTRA and UTRAN," Sep. 2006

SUMMARY OF INVENTION

Technical Problem

In the third-generation mobile communication system, it is possible to achieve a transmission rate of maximum approximately 2 Mbps on the downlink by using a fixed band of approximately 5 MHz. On the other hand, in the LTE system, it is possible to achieve a transmission rate of about maximum 300 Mbps on the downlink and about 75 Mbps on the uplink by using a variable band which ranges from 1.4 MHz to 20 MHz. Also, in the UMTS network, the successor system of LTE (referred to as, for example, "LTE-Advanced" or "LTE enhancement" (hereinafter referred to as "LTE-A")) is under study for the purposes of further improving frequency usage efficiency and the peak data rate.

In the LTE-A system, allocation of a wider frequency band than in LTE is under study for the purpose of further improving frequency usage efficiency and peak throughput. Also, in LTE-A (for example, Rel. 10), having backward compatibility with LTE is one requirement, and therefore a transmission band configuration to have a plurality of fundamental frequency blocks (component carriers (CCs)) each having a bandwidth which can be used in LTE, is employed. Consequently, feedback control information in response to data channels transmitted in a plurality of downlink CCs simply increases by a multiple of the number of CCs. Also, in addition to these, LTE-specific technologies, such as the multi-cell cooperative transmission technology and the MIMO (Multiple Input Multiple Output) technology to use a greater number of transmitting/receiving antennas than in LTE, are under study, and the increase of feedback control information to control these is also possible. Consequently, the amount of information of feedback control information increases, and it is therefore necessary to study the method of transmitting feedback control information on the uplink channels.

The present invention has been made in view of the above, and it is therefore one object of the present invention to provide a mobile terminal apparatus and a radio communication method, which can efficiently transmit feedback control information on an uplink control channel in a communication system having a system band formed with a plurality of fundamental frequency blocks.

Solution to Problem

A mobile terminal apparatus according to the present invention is a mobile terminal apparatus to perform radio communication in a system band that is formed with a plurality of fundamental frequency blocks, and has: a demodulation section that demodulates downlink shared channel signals for each of the plurality of fundamental frequency blocks; a detection section that detects a state of a retransmission acknowledgement signal of each of the plurality of fundamental frequency blocks based on the demodulated downlink shared channel signals; and an uplink control channel processing section that maps the retransmission acknowledgement signals of the plurality of fundamental frequency blocks to an uplink control channel of a specific fundamental frequency block that is selected from the plurality of fundamental frequency blocks, and the uplink control channel processing section selects a plurality of allocated resources from the uplink control channel, and defines the states of the retransmission acknowledgement signals of the plurality of fundamental frequency blocks by bit information by phase shift modulation and channel selection information.

According to this configuration, it is possible to transmit additional information that is defined by channel selection information, in addition to bit information by phase shift modulation, so that it is possible to efficiently transmit feedback control information of a plurality of fundamental frequency blocks by an uplink control channel, using a conventional PUCCH structure.

Technical Advantageous of Invention

According to the present invention, it is possible to efficiently transmit feedback control information by an uplink control channel.

BRIEF DESCRIPTION OF DRAWINGS

FIG. 4 provides diagrams each showing a mapping table for retransmission acknowledgement signals defined in Format 1a/1b of LTE (Rel. 8);

FIG. 5 provides diagrams each showing an example of a mapping table for transmission of retransmission acknowledgement signals, according to the present embodiment;

FIG. 6 provides diagrams each showing an example of a mapping table transmission of retransmission acknowledgement signals, according to the present embodiment;

FIG. 7 provides diagrams each showing an example of a mapping table for transmission of retransmission acknowledgement signals, according to the present embodiment;

FIG. 8 provides diagrams each showing an example of a mapping table for transmission of retransmission acknowledgement signals, according to the present embodiment;

FIG. 12 is a diagram showing an example of a mapping table for transmission of retransmission acknowledgement signals, according to the present embodiment;

FIG. 13 provides diagrams each showing an example of a mapping table for transmission of retransmission acknowledgement signals, according to the present embodiment; and FIG. 14 is a diagram showing an example of a mapping table for transmission of retransmission acknowledgement signals, according to the present embodiment.

DESCRIPTION OF EMBODIMENTS

As described above, in response to a signal of a downlink shared channel (PDSCH) signal of a downlink CC, a retransmission acknowledgement signal (ACK/NACK), which is its feedback control information, is transmitted by an uplink control channel (PUCCH). A retransmission acknowledgement signal is represented by either a positive acknowledgment (ACK), which indicates that a transmission signal has been received properly, or a negative acknowledgment (NACK), which indicates that a transmission signal has not been received properly.

Furthermore, in the LTE-A system, allocation of a wider frequency band than in LTE is under study for the purpose of further improving frequency usage efficiency and peak throughput, and a transmission band configuration having a plurality of fundamental frequency blocks (CCs) each having a bandwidth which can be used in LTE, is employed. Consequently, retransmission acknowledgement signals, which are feedback control information in response to the PDSCH transmitted from a plurality of downlink CCs, may also be transmitted to a plurality of downlink CCs.

Figure 1:
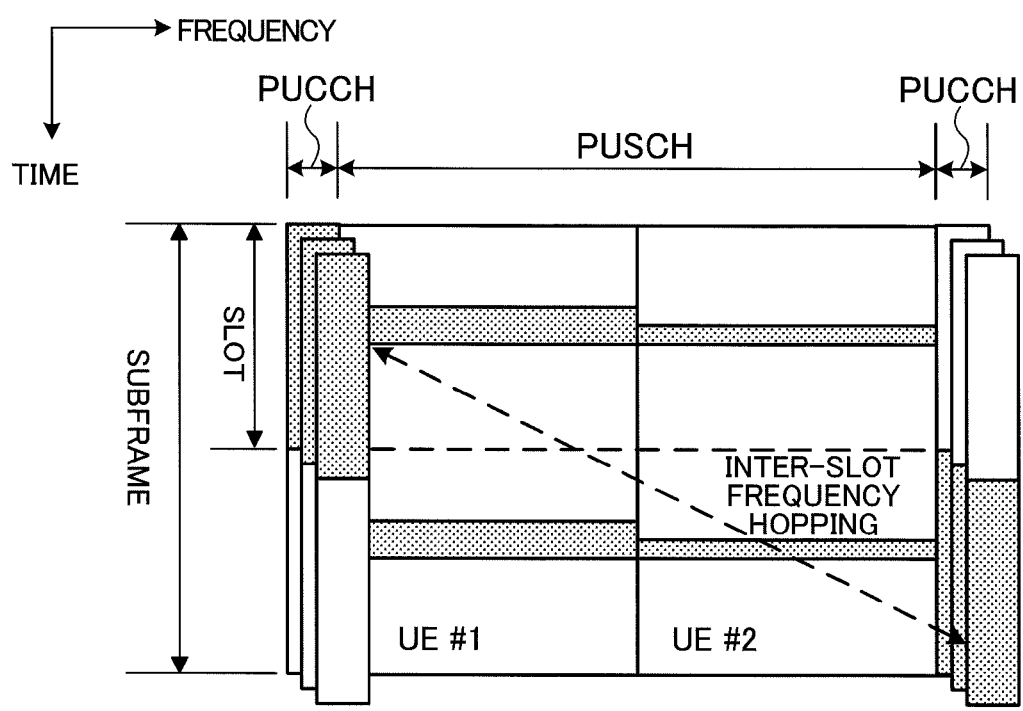
FIG. 1 is a diagram for explaining a channel structure where an uplink signal is mapped.
Figure 2A:
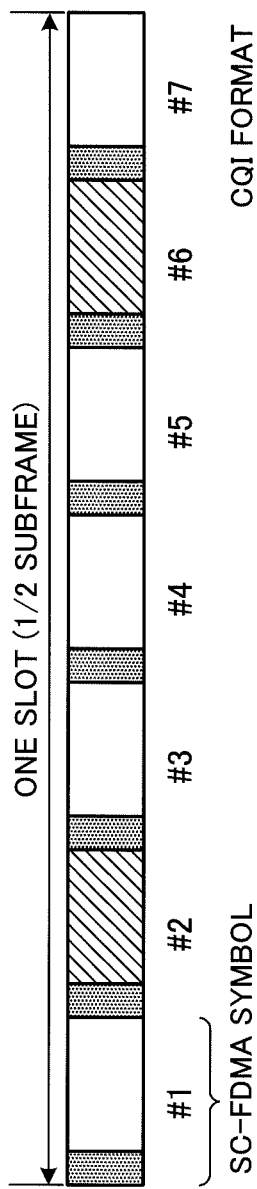
FIG. 2 is a diagram showing a physical uplink control channel format.
Figure 2B:
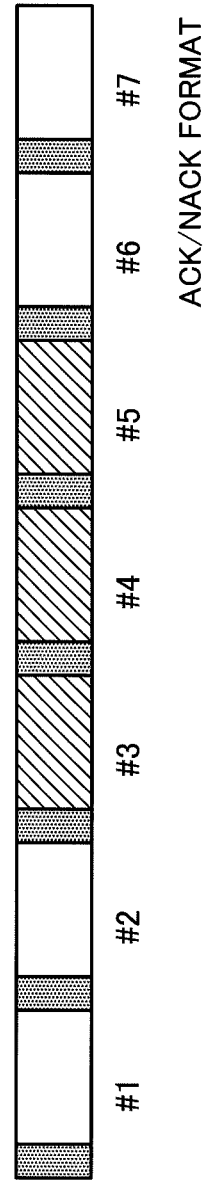
Figure 3:
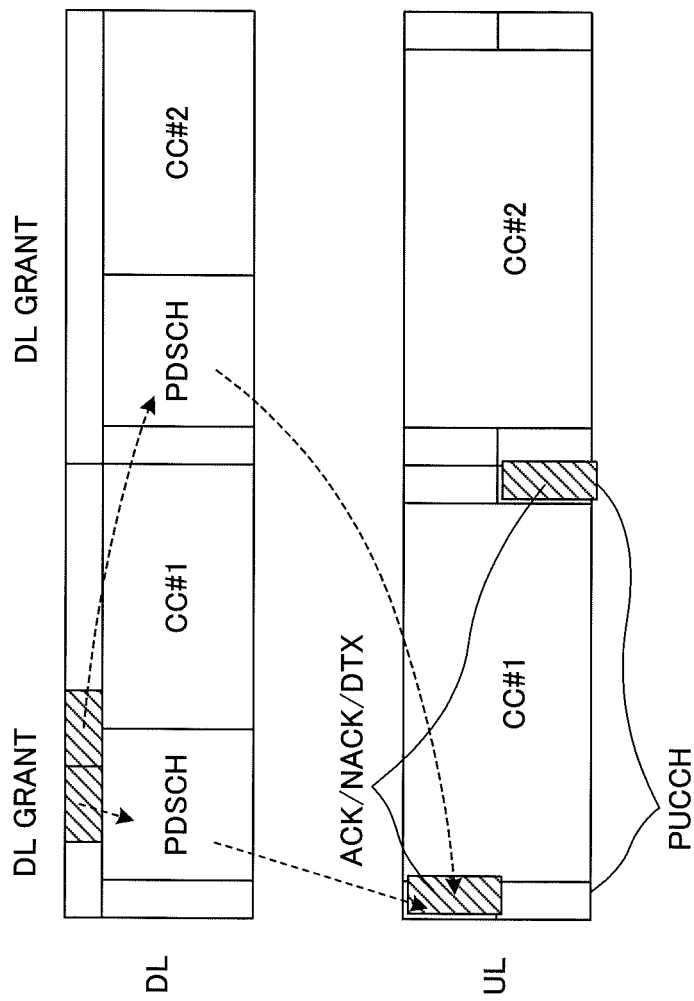
FIG. 3 is a diagram showing an example of a method of transmitting the states of retransmission acknowledgement signals of a plurality of fundamental frequency blocks using an uplink control channel of a specific fundamental frequency block.

For the method of transmitting feedback control information in this case, it may be possible to generate, in a mobile terminal apparatus, feedback control information for each component carrier, based on signals of a plurality of component carriers (here, CC #1 and CC #2) received from a radio base station apparatus, and, when no PUSCH signal is transmitted in the same subframe, map the feedback control information to the uplink control channel (PUCCH) of a user-specific (UE-specific) component carrier (here, CC #1) and transmit (see FIG. 3).

Also, as described above, received channel quality information (CQI) and a retransmission acknowledgement signal (ACK/NACK) transmitted by the PUCCH are both transmitted by twelve subcarrier bands. When a retransmission acknowledgement signal is transmitted, among the seven SC-FDMA symbols in one slot, three SC-FDMA symbols are transmitted for the RS. In one SC-FDMA symbol, orthogonal CDMA by twelve cyclic shifts is defined, and, furthermore, by allocating a time domain orthogonal code over three SC-FDMA symbols, it is possible to multiplex maximum 12×3=36 channels (allocate to resources).

Now, in LTE (Rel. 8), reporting ACK/NACK (Format 1a/1b) in response to a downlink shared channel (PDSCH) signal is defined (see FIG. 4), and the following multiple states can be reported.

In the event of transmitting one codeword (rank 1), there are three states, namely "ACK," "NACK" and "DTX" (Discontinuous reception)" (see FIG. 4A), and, in the event of transmitting two codewords (rank 2), there are five states, namely "ACK, ACK," "ACK, NACK," "NACK, ACK," "NACK, NACK" and "DTX" (see FIG. 4B).

A codeword represents the coding unit in channel coding (error correction coding), and, when MIMO multiplex transmission is adopted, one codeword or a plurality of codewords are transmitted. In LTE, single-user MIMO uses maximum two codewords. In the event of two-layer transmission, each layer serves as an individual codeword, and, in the event of four-layer transmission, every two layers serve as one codeword.

In FIG. 4, "ACK" means that transmission is a success, "NACK" means that error is detected, and "DTX" means that data is not recognized (no response). DTX is a detection result to indicate that "neither ACK nor NACK has been reported from a mobile terminal apparatus," and this means that the mobile terminal apparatus has been unable to receive the downlink control channel (PDCCH: Physical Downlink Control CHannel). In this case, the mobile terminal apparatus does not detect the PDSCH transmitted to that mobile terminal apparatus, and, as a result, does not transmit ACK or NACK. On the other hand, although a radio base station apparatus transmits the next new data upon receiving ACK, in the event of NACK or in the DTX state without response, the radio base station apparatus carries out retransmission control to retransmit data that has been transmitted. Note that, when the received power in the resources allocated to ACK/NACK is equal to or lower than a predetermined value on the uplink, the radio base station apparatus is able to detect DTX.

Also, in the mapping tables of FIG. 4, "0" indicates that, in the subject subframe, the mobile terminal apparatus does not transmit information to the radio base station apparatus, and "1," "−1," "j" and "−j" each indicate a predetermined phase state (bit information). For example, in FIG. 4A, "1" and "−1" correspond to "0" and "1," respectively, and can represent one bit of information. Also, in FIG. 4B, "1," "−1," "j" and "−j" correspond to "00," "11," "10" and "01," respectively, and can represent two bits of information. Consequently, in ACK/NACK (Format 1a/1b), up to maximum two bits can be transmitted.

However, when PDSCH signals are received using a plurality of CCs and a user terminal UE tries to report the above three states (one codeword) or five states (two codewords) per CC in the PUCCH of a specific CC (for example, CC #1), the problem arises that the number of bits of the retransmission acknowledgement signals becomes large.

In view of the above, the present inventor has conceived of, when gathering and transmitting retransmission acknowledgement signals in response to signals of the downlink shared channels of a plurality of CCs in the uplink control channel of specific CC, selecting a plurality of allocated resources (channels) in the above uplink control channel, and defining each state of the retransmission acknowledgement signals for a plurality of CCs by bit information by phase shift modulation and by resource selection information, which is the selected positions of the allocated resources, and made the present invention.

Now, embodiments of the present invention will be described below in detail with reference to the accompanying drawings. Note that, although an example will be described below with the present embodiment where the present invention is applied to LTE-A, the present invention is by no means limited to cases of being applied to LTE-A. The present invention may be applied to any communication system as long as the communication system transmits uplink control information on the uplink using carrier aggregation, which provides a wide band by gathering a plurality of fundamental frequency block into one.

Also, although cases will be shown in the following descriptions where the number of downlink CCs is two, the present invention is by no means limited to these, and is also applicable to cases where the number of downlink CCs (or the number of uplink CCs) is greater than two (or one). Also, although cases will be described where the number of allocated resources is two or four, the number of allocated resources is by no means limited to these. Also, although retransmission acknowledgement signals (ACK/NACK/DTX) will be described as feedback control information to map to uplink control channels, the present invention is by no means limited to these.

FIG. 5 shows a mapping table to define the states of PCC and SCC retransmission acknowledgement signals, in a system band formed with the first fundamental frequency block (PCC: Primary Component Carrier) and the second fundamental frequency block (SCC: Secondly Component Carrier). A mobile terminal apparatus maps a retransmission acknowledgement signal to an uplink control channel based on the mapping table and transmits the uplink control channel to the radio communication apparatus.

FIG. 5A shows an example of a mapping table used in the event spatial multiplexing is not applied to the PCC and the SCC (rank 1) and the number of resources allocated for transmission of a retransmission acknowledgement signal is two. Three states (ACK, NACK and DTX) are defined per CC, and nine patterns are possible as combinations of the PCC and SCC states.

In FIG. 5A, the three states "ACK," "NACK" and "DTX" of the PCC retransmission acknowledgement signals are defined by bit information by phase shift modulation (here, QPSK data modulation), and the three states "ACK," "NACK" and "DTX" of the SCC retransmission acknowledgement signals are defined by resource selection information (also referred to as "channel selection information") as to which resource is selected between the two allocated resources (Ch 1 and Ch 2). When the number of allocated resources is two, one bit of information can be added by the resource selection information, so that, combined with the bit information by QPSK data modulation, it is possible to support three bits of information.

For example, in the event of transmitting one codeword, when reporting the three states "DTX," "NACK" and "ACK" of the PCC retransmission acknowledgement signals by allocating bit information by QPSK data modulation to each state separately, it is possible to allocate the information bits of "j (10)" to "DTX," "1 (00)" to "NACK" and "−1 (11)" to "ACK." In this case, information bits can be allocated individually with respect to "DTX" of the PCC, so that it is possible to report the "DTX" state (Explicit DTX signaling) to the radio base station apparatus separately.

Note that, when the PCC and the SCC are both "DTX," all the allocated resources are made "0" and transmission is not carried out in this subframe.

Also, the states of the SCC retransmission acknowledgement signals are defined by one-bit resource selection information. Here, the two states "DTX" or "NACK" and "ACK" are defined by resource selection information, so that the number of states that can be reported separately is reduced. To be more specific, between the allocated resources, when Ch 1 is selected (when information is mapped to Ch 1 and transmitted), this means that the state of the SCC is either the "DTX" or "NACK" state, and, when Ch 2 is selected (when information is mapped to Ch 2 and transmitted), this indicates the state of "ACK." That is to say, instead of separately defining the state of the SCC for each of the three states, the resource selection information is defined such that the "ACK" state can be identified, and the "DTX" and "NACK" states are defined together, thereby reducing the number of bits.

When a retransmission acknowledgement signal is "DTX" or "NACK," in either case, the radio base station apparatus executes retransmission control to retransmit data that has been transmitted, so that, even if DTX and NACK cannot be differentiated, this has little impact. On the other hand, when a retransmission acknowledgement signal is "ACK," the radio base station apparatus transmits the next new data, so that it is preferable to define the ACK state to be identified preferentially. Consequently, as shown in FIG. 5A, when the number of allocated resources is two (one bit of information is added by resource selection), it is preferable to define the "ACK" state to be identified preferentially in the SCC.

In this way, by defining two allocated resources by bit information by phase shift modulation and by resource selection information, it is possible to support three bits of information. Also, compared to cases of allocating bit information to both of the two allocated resources, it is possible to provide an effect of securing single-carrier characteristics by allocating bit information to only one resource.

Also, when, between two CCs, the CC (UE-specific CC) to be used preferentially (to gather the retransmission acknowledgement signals of a plurality of CCs) by a mobile terminal apparatus is set, it is preferable to define the CC to prioritize (here, the PCC) by bit information by QPSK data modulation, and define the other CC (here, the SCC) by resource selection information. By this means, it is possible to support a large number of bits with respect to the states of the PCC retransmission acknowledgement signals, so that it is possible to provide a configuration to define and report the states of the PCC retransmission acknowledgement signals in detail. For example, with the mapping table shown in FIG. 5A, it is possible to support such that the "DTX" state can be reported separately (Explicit DTX signaling) with respect to the PCC.

FIG. 5B shows an example of a mapping table to be used when spatial multiplexing is applied to the PCC and the SCC (rank 2) and the number of resources allocated for transmission of retransmission acknowledgement signals is two.

In FIG. 5B, also, the states of the PCC are defined by bit information by phase shift modulation (here, QPSK data modulation), and the states of the SCC are defined by resource selection information.

In the event of transmitting two codewords, with respect to the state of each layer of the PCC, it is preferable not to individually allocate information bits to "DTX," and report the four states "ACK, ACK," "ACK, NACK," "NACK, ACK" and "NACK, NACK/DTX" by allocating bit information to each state separately.

To be more specific, in layer 1 and layer 2, bit information of "−1" is defined with respect to "ACK, ACK," "j" with respect to "ACK, NACK," "−j" with respect to "NACK, ACK" and "1" with respect to "NACK, NACK" or "DTX." That is to say, in the event of two codewords, one information bit of "1" is allocated to the "NACK, NACK" or "DTX" state of the PCC, and therefore the number of states that can be reported separately is reduced. In this way, in the event of transmitting two codewords, it is possible to define not to individually allocate information bits to DTX of the PCC. That is, the mapping table shown in FIG. 5 is configured such that DTX of the PCC is individually encoded and reported only in the event of one codeword, and, in the event of two codewords, DTX alone is not reported.

Also, in the event of transmitting two codewords, it is preferable to define two states, namely "DTX," "NACK, NACK," "NACK, ACK" or "ACK, NACK," and "ACK, ACK," by one-bit resource selection information, with respect to the states of each layer of the SCC. In this case, when DTX or NACK is included, this is not individually defined, and the number of states that can be reported separately is reduced, and "ACK, ACK" is defined to be identified preferentially. To be more specific, between the two allocated resources, when Ch 1 is selected, this means that the state of the SCC is one of "DTX," "NACK, NACK," "NACK, ACK" and "ACK, NACK," and, when Ch 2 is selected, this indicates the "ACK, ACK" state. That is, as for the states of the SCC, each state can be defined such that, in the event of transmitting two codewords by applying spatial bundling, ACK is returned only when the two layers are both ACK, and NACK is returned otherwise.

Also, even when two-codeword transmission is carried out, it is still possible to reduce the number of bits and transmit feedback control information efficiently, by defining the states of the retransmission acknowledgement signals of the PCC to be used preferentially, by bit information by QPSK data modulation, defining the states of the retransmission acknowledgement signals of the SCC by resource selection information, and defining the bit information and the resource selection information such that "ACK, ACK" can be identified.

Next, an example of a mapping table to be used when the number of allocated resources is four is shown in FIG. 6.

FIG. 6A shows an example of a mapping table to be used when spatial multiplexing is not applied to the PCC and the SCC (rank 1), and FIG. 6B shows an example of a mapping table to be used when spatial multiplexing is applied to the PCC and the SCC (rank 2).

In FIG. 6A and FIG. 6B, the "ACK," "NACK" and "DTX" states of the PCC retransmission acknowledgement signals are defined by bit information by phase shift modulation (here, QPSK data modulation), and the "ACK," "NACK" and "DTX" states of the SCC retransmission acknowledgement signal are defined by resource selection information as to which resource is selected among the four resources (Ch 1 to Ch 4). When the number of allocated resources is four, it is possible to add two bits of information by the resource selection information, so that, combined with the bit information by QPSK data modulation, it is possible to support four bits of information.

For example, in the event of transmitting one codeword (see FIG. 6A), the three states "DTX," "NACK" and "ACK" of the PCC retransmission acknowledgement signals are reported by separately allocating bit information by QPSK data modulation to each state. For example, it is possible to allocate the information bits of "j (10)" to "DTX," "1 (00)" to "NACK" and "−1 (11)" to "ACK." In this case, information bits can be allocated individually with respect to "DTX," so that it is possible to report the "DTX" state (Explicit DTX signaling) to the radio base station apparatus separately.

Also, as for the state of the SCC, the "DTX," "NACK" and "ACK" states can be defined by two bits of resource selection information, so that it is possible to report "DTX," "NACK" and "ACK" by allocating resource selection information to each state separately. For example, it is possible to define that, among the allocated resources (Ch 1~Ch 4), the state of the SCC is the "DTX" state when Ch 1 is selected, the state of the SCC is the "NACK" state when Ch 2 is selected, and the state of the SCC is the "ACK" state when Ch 3 is selected. In this case, it is possible to individually allocate information bits with respect to "DTX" of the SCC as well. Note that, in the event of transmitting one codeword (see FIG. 6A), Ch 4 is not absolutely necessary.

In the event of transmitting two codewords (see FIG. 6B), with respect to the state of each layer of the PCC, it is preferable not to individually allocate information bits to "DTX," and report the four states "ACK, ACK," "ACK, NACK," "NACK, ACK" and "NACK, NACK/DTX" by allocating bit information to each state separately.

To be more specific, in layer 1 and layer 2 of the PCC, bit information of "−1" is defined with respect to "ACK, ACK," "j" with respect to "ACK, NACK," "−j" with respect to "NACK, ACK" and "1" with respect to "NACK, NACK" or "DTX." That is to say, in the event of two codewords, one information bit of "1" is allocated to the "NACK, NACK" or "DTX" state, and therefore the number of states that can be reported separately is reduced.

Also, when the number of allocated resources is four, the state of each layer of the SCC can also be supported by two bits of resource selection information. Consequently, similar to the PCC, with respect to the state of each layer of the SCC, it is preferable not to individually allocate information bits to "DTX," and report the four states "ACK, ACK," "ACK, NACK," "NACK, ACK" and "NACK, NACK/DTX" by allocating resource selection information to each state separately.

To be more specific, between the two allocated resources, when Ch 1 is selected, this means that the state of the SCC is the "DTX" state or the "NACK, NACK" state, when Ch 2 is selected, this indicates the "NACK, ACK" state, when Ch 3 is selected, this indicates the "ACK, NACK" state, and, when Ch 4 is selected, this indicates the "ACK, ACK" state. That is to say, with respect to the states of the SCC, it is possible to reduce the number of bits by defining the resource selection information such that "ACK" can be identified when at least one of the layers is in the "ACK" state and by defining the "DTX" and "NACK, NACK" states together.

Next, mapping tables that are different from the above-described mapping tables will be described with reference to FIG. 7 and FIG. 8. In FIG. 7 and FIG. 8, the PCC is defined to be equivalent to the ACK/NACK (Format 1a/1b) mapping table of LTE (Rel. 8) when the SCC is DTX. Also, to make it possible to report the "DTX" state to a radio base station apparatus separately with respect to the PCC or the SCC (Explicit DTX signaling), the states of the PCC and the states of the SCC are defined by combining bit information by QPSK data modulation, and resource selection information.

FIG. 7 provides examples of mapping tables to be used when the number of allocated resources is two, where FIG. 7A shows a case where spatial multiplexing is not applied to the PCC (rank 1) and FIG. 7B shows a case where spatial multiplexing is applied to the PCC (rank 2). Also, in FIG. 7A and FIG. 7B, case of rank 1 and rank 2 are shown with respect to the states of the SCC.

When the PCC is subject to one-codeword transmission (see FIG. 7), the three states "DTX," "NACK" and "ACK" of the PCC retransmission acknowledgement signals are each defined using bit information by QPSK data modulation and resource selection information, taking into account the relationship with the states of the SCC retransmission acknowledgement signals. Here, information that is reported when the SCC is DTX is set to be identifiable by itself.

For example, when the SCC is in the "DTX" state, the information bit of "1" is allocated to "NACK" of the PCC, the information bit of "−1" is allocated to "ACK," of the PCC and Ch 1 is selected (the information bits are mapped to Ch 1). On the other hand, when the SCC is in states other than "DTX," the information bit of "−j" is allocated to "NACK" of the PCC and the information bit of "j" is allocated to "ACK" of the PCC. Also, when the state of the PCC is "DTX," the information bit of "1" (when the SCC at least incudes "NACK") or the information bit of "−1" (when the SCC is "ACK" alone) is allocated depending on the state of the SCC, and Ch 2 is selected (the information bit is mapped to Ch 2). Note that, when the PCC and the SCC are both "DTX," all the allocated resources are "0."

In this way, by defining each of the three states "DTX," "NACK" and "ACK" of the PCC retransmission acknowledgement signals using bit information by QPSK data modulation and resource selection information, taking into account the relationship with the states of the SCC retransmission acknowledgement signals, and by defining information that is reported when the SCC is DTX to be identifiable by itself, it is possible to provide a configuration to define and report the states of the PCC and the SCC retransmission acknowledgement signals in detail. Also, by defining a mapping table as shown in FIG. 7A, when the SCC is DTX, it is possible to make the mapping table equivalent to the ACK/NACK (Format 1a) mapping table of LTE (Rel. 8) (see FIG. 4A). By this means, it is possible to make the mapping table for the PCC common without regardless of whether or not carrier aggregation is used, and prevent instantaneous disruption of communication during the process of switching between using and not using carrier aggregation. Also, as shown in FIG. 7A, report information when the PCC or the SCC is in the DTX state can be each distinguished from other report information and reported individually, so that it is possible to report the "DTX" state to the radio base station apparatus (Explicit DTX signaling).

In the event the PCC is subject to two-codeword transmission (see FIG. 7B), the four states "NACK, NACK," "NACK, ACK," "ACK, NACK" and "ACK, ACK" of the PCC are each defined using bit information by QPSK data modulation and resource selection information, taking into account the relationship with the states of the SCC.

To be more specific, given the four states "NACK, NACK," "NACK, ACK," "ACK, NACK" and "ACK, ACK" of the PCC, when the SCC includes "DTX" or "NACK," "1," "−j," "j" and "−1" are allocated, respectively, and Ch 1 is selected. On the other hand, Ch 2 is selected when the SCC includes "ACK" alone, "−j" is allocated when the PCC includes "NACK," and "j" is allocated when the PCC includes "ACK, ACK."

When the state of the PCC is "DTX," as shown in above FIG. 7A, the information bit of "1" (when the SCC at least incudes "NACK") or the information bit of "−1" (when the SCC is "ACK" alone) is allocated depending on the state of the SCC, and Ch 2 is selected. Consequently, even when the PCC is rank 2, it is possible to individually allocate information bits to "DTX" of the PCC, and report the "DTX" state to the radio base station apparatus (Explicit DTX signaling). Also, by defining a mapping table as shown in FIG. 7B, when the SCC is DTX, it is possible to make the mapping table equivalent to the ACK/NACK (Format 1b) mapping table of LTE (Rel. 8) (see FIG. 4B). By this means, it is possible to make the mapping table for the PCC common without regardless of whether or not carrier aggregation is used, and prevent instantaneous disruption of communication during the process of switching between using and not using carrier aggregation.

Next, FIG. 8 provides examples of mapping tables to be used when the number of allocated resources is four.

FIG. 8A shows an example of a mapping table to be used when spatial multiplexing is not applied to the PCC (rank 1), and FIG. 8B shows an example of a mapping table to be used when spatial multiplexing is applied to the PCC (rank 2). Also, FIG. 8A and FIG. 8B show cases of rank 1 and rank 2 with respect to the SCC.

In FIG. 8A, when the SCC is in the "DTX" state, the information bit of "1" is allocated to "NACK" of the PCC, the information bit "−1" is allocated to "ACK" of the PCC and Ch 1 is selected. On the other hand, when the SCC is in states other than "DTX," the information bit of "−j" is allocated to "NACK" of the PCC, and the information bit of "j" is allocated to "ACK" of the PCC. Also, when the state of PCC is "DTX," the information bit of "1" (when the SCC at least incudes "NACK") or the information bit of "−1" (when the SCC is "ACK" alone) is allocated depending on the state of the SCC, and a Ch other than Ch 1 is selected. Note that, when the PCC and the SCC are both "DTX," all the allocated resources are "0." By using the mapping table shown in FIG. 8A, report information when the PCC or the SCC is in the DTX state can be each distinguished from other report information and reported individually, so that it is possible to separately report the "DTX" state of the PCC and the SCC to the radio base station apparatus (Explicit DTX signaling).

In FIG. 8B, given the four states "NACK, NACK," "NACK, ACK," "ACK, NACK" and "ACK, ACK" of the PCC, when the SCC is formed with either "DTX" or "NACK" alone, "1," "−j," "j" and "−1" are allocated, respectively, and Ch 1 is selected. On the other hand, Ch 2 is selected when the SCC includes "ACK" alone, "−j" is allocated when the PCC includes "NACK," and "j" is allocated when the PCC includes "ACK, ACK." Also, it is possible to define each state by selecting Ch 3 when the SCC is "NACK, ACK," and selecting Ch 4 when the SCC is "ACK, NACK."

By using the mapping table shown in FIG. 8, it is possible to provide a configuration to define and report the states of the PCC and SCC retransmission acknowledgement signals in detail. Also, when the SCC is DTX, it is possible to make the mapping table equivalent to the ACK/NACK (Format 1a/1b) mapping table of LTE (Rel. 8) (see FIG. 4).

Note that, although cases have been described above where, in the above-described mapping tables, the number of allocated resources is two or four, the number of allocated resources is by no means limited to these. Also, the number of allocated resources can be determined from various perspectives. For example, as an example of a method of determining the number of allocated resources, it is possible to determine according to the number of codewords.

To be more specific, for example, it is possible to allocate two resources (the number of allocated resources is two) when the PCC and the SCC are both one codeword, allocate three resources (the number of allocated resources is three) when one of the PCC and the SCC is one codeword and the other one is two codewords, and allocate four resources (the number of allocated resources is four) when the PCC and the SCC are both two codewords. In this way, by determining the number of resources to allocate depending on the number of codewords, it is possible to minimize the number of resources to allocate.

Now, examples of mapping tables in which the number of allocated resource is controlled depending on the number of codewords will be described with reference to FIG. 12 to FIG. 14. Note that FIG. 12 shows a case where the PCC and the SCC are both one codeword (the number of allocated resources is two), FIG. 13 shows a case where one of the PCC and the SCC is one codeword and the other one is two codewords (the number of allocated resources is three), and FIG. 14 shows a case where the PCC and the SCC are both two codewords (the number of allocated resources is four).

In FIG. 12 to FIG. 14, the PCC is defined to be equivalent to the ACK/NACK (Format 1a/1b) mapping table of LTE (Rel. 8) when the SCC is DTX. Also, at least when the PCC is one codeword, to make it possible to report the "DTX" state of the PCC to a radio base station apparatus separately (Explicit DTX signaling), the states of the PCC and the states of the SCC are defined by combining bit information by QPSK data modulation, and resource selection information.

When the PCC and the SCC are subject to one-codeword transmission (see FIG. 12), two resources are allocated, and the state of the PCC retransmission acknowledgement signal and the state of the SCC retransmission acknowledgement signal are defined using bit information by QPSK data modulation and resource selection information. Also, information that is reported when the PCC is DTX is set to be identifiable by itself.

For example, when the PCC is in the "DTX" state, the information bit of "1" is allocated to "NACK" of the SCC, the information bit of "−1" is allocated to "ACK," and Ch 2 is selected (the information bits are mapped to Ch 2). On the other hand, when the SCC is in the "DTX" or "NACK" state, the information bit of "1" is allocated to "NACK" of the PCC, the information bit of "−1" is allocated to "ACK," and Ch 1 is selected. In this way, by defining the "DTX" or "NACK" state of the SCC by not allocating information bits to each state separately, it is possible to reduce the number of states that can be reported separately. Also, when the SCC is in the "ACK" state and the PCC is not "DTX," the information bit of "j" is allocated, and, also, Ch 1 is selected for "NACK" of the PCC and Ch 2 is selected for "ACK" of the PCC. Note that, when the PCC and the SCC are both "DTX," all the allocated resources are "0."

By defining a mapping table as shown in FIG. 12, when the SCC is DTX, it is possible to make the mapping table equivalent to the ACK/NACK (Format 1a) mapping table of LTE (Rel. 8) (see FIG. 4A). Also, as shown in FIG. 12, report information when the PCC is in the DTX state can be distinguished from other report information and reported individually, so that it is possible to report the "DTX" state to the radio base station apparatus individually (Explicit DTX signaling).

When one of the PCC and the SCC is one codeword and the other one is two codewords, three resources are allocated, and the state of the PCC retransmission acknowledgment signal and the state of the SCC retransmission acknowledgment signal are defined using bit information by QPSK data modulation and resource selection information.

For example, when the PCC is subject to two-codeword transmission and the SCC is subject to one-codeword transmission (see FIG. 13A), given the four states "NACK, NACK," "NACK, ACK," "ACK, NACK" and "ACK, ACK" of the PCC, when the SCC is "DTX," "1," "−j," "j" and "−1" are allocated, respectively, and Ch 1 is selected. By this means, when the SCC is DTX, it is possible to make the mapping table equivalent to the ACK/NACK (Format 2a) mapping table of LTE (Rel. 8) (see FIG. 4B).

Also, when the PCC is in the "DTX" or "NACK" state, the information bit of "1" is allocated to "NACK" of the SCC, the information bit of "−1" is allocated to "ACK," and Ch 2 is selected. That is to say, the "DTX" or "NACK" state of the PCC is not defined separately, and the number of states that can be reported is reduced.

Also, "−j" and "j" are allocated to "NACK, ACK" and "ACK, NACK" of the PCC, respectively, Ch 3 is selected for "NACK" of the SCC, and Ch 2 is selected for "ACK" of the SCC. Also, when the SCC is in states other than "DTX," Ch 3 is selected for "ACK, ACK" of the PCC, "−1" is allocated to "NACK" of the SCC and "1" is allocated to "ACK."

When the PCC is subject to one-codeword transmission and the SCC is subject to two-codeword transmission (see FIG. 13B), a specific Ch (here, Ch 2) is selected when the PCC is in the "DTX" state, and the other Chs are selected when the PCC is in other states. By this means, report information when the PCC is in the DTX state can be distinguished from other report information and reported individually. Here, a case is shown where, when the PCC is in the "DTX" state, Ch 2 is selected, and "−j," "j" and "−1" are allocated to the three states "NACK, ACK," "ACK, NACK," and "ACK, ACK" of the SCC, respectively. Also, a case is shown where, when the PCC is in the "DTX" state and the SCC is "NACK, NACK" or "DTX," all the allocated resources are "0" and no transmission is carried out in that subframe.

Also, when the SCC is in the "DTX" or "NACK" state, the number of states that can be reported separately is reduced by allocating the information bit of "1" to "NACK" of the PCC, allocating the information bit of "−1" to "ACK," and selecting Ch 1. Also, when the SCC is in the "NACK, ACK" and "ACK, NACK" states, the information bits "−j" and "j" are allocated, Ch 3 is selected for "NACK" of the PCC and Ch 1 is selected for "ACK." Also, when the SCC is in the "ACK, ACK" state, Ch 3 is selected, and also "−1" is allocated to "NACK" of the PCC and "1" is allocated to "ACK."

When the PCC and the SCC are both two codewords (see FIG. 14), four resources are allocated, and the states of the PCC retransmission acknowledgment signals and the states of the SCC retransmission acknowledgment signals are defined using bit information by QPSK data modulation and resource selection information.

For example, when the SCC is "DTX" or "NACK," Ch 1 is selected, and "1," "−j," "j" and "−1" are allocated to the four states "NACK, NACK," "NACK, ACK," "ACK, NACK," "ACK, ACK" of the PCC, respectively. By this means, when the SCC is DTX, it is possible to make the mapping table equivalent to the ACK/NACK (Format 2a) mapping table of LTE (Rel. 8) (see FIG. 4B).

Also, when the SCC is in states other than "DTX" or "NACK, NACK," the number of states that can be reported separately is reduced by selecting Ch 2 for "DTX" and "NACK, NACK" of the PCC and by allocating "−j," "j" and "−1" to "NACK, ACK," "ACK, NACK" and "ACK, ACK" of the SCC.

Also, when the SCC is in states other than "ACK, ACK," "−j," "j" and "−1" are allocated to "NACK, ACK," "ACK, NACK" and "ACK, ACK" of the PCC, respectively, Ch 3 is selected when the SCC is "NACK, ACK," and Ch 4 is selected when the SCC is "ACK, NACK." Also, when the PCC is in states other than "DTX" or "NACK, NACK," "1" is allocated to "ACK, ACK" of the SCC, Ch 4 is selected for "NACK, ACK" of the PCC, Ch 3 is selected for "ACK, NACK" of the PCC, and Ch 2 is selected for "ACK, ACK" of the PCC.

Note that the mapping tables shown in FIG. 12 to FIG. 14 are only examples and the mapping tables that are applicable to the present invention are by no means limited to these. Also, the relationship between the number of codewords and the number of allocated resources is not limited to this, and, for example, it is equally possible to allocate four resources when the PCC and the SCC are both one codeword (see FIG. 6), or allocate two or four resources when one of the PCC and the SCC is one codeword and the other one is two codewords (see FIG. 7 and FIG. 8).

Now, the configurations of a mobile terminal apparatus and a radio base station apparatus adopting the radio communication method described with the above embodiments will be described. Here, a case of using a radio base station apparatus and a mobile terminal apparatus supporting a system of the LTE-A scheme (LTE-A system) will be described.

Figure 9:
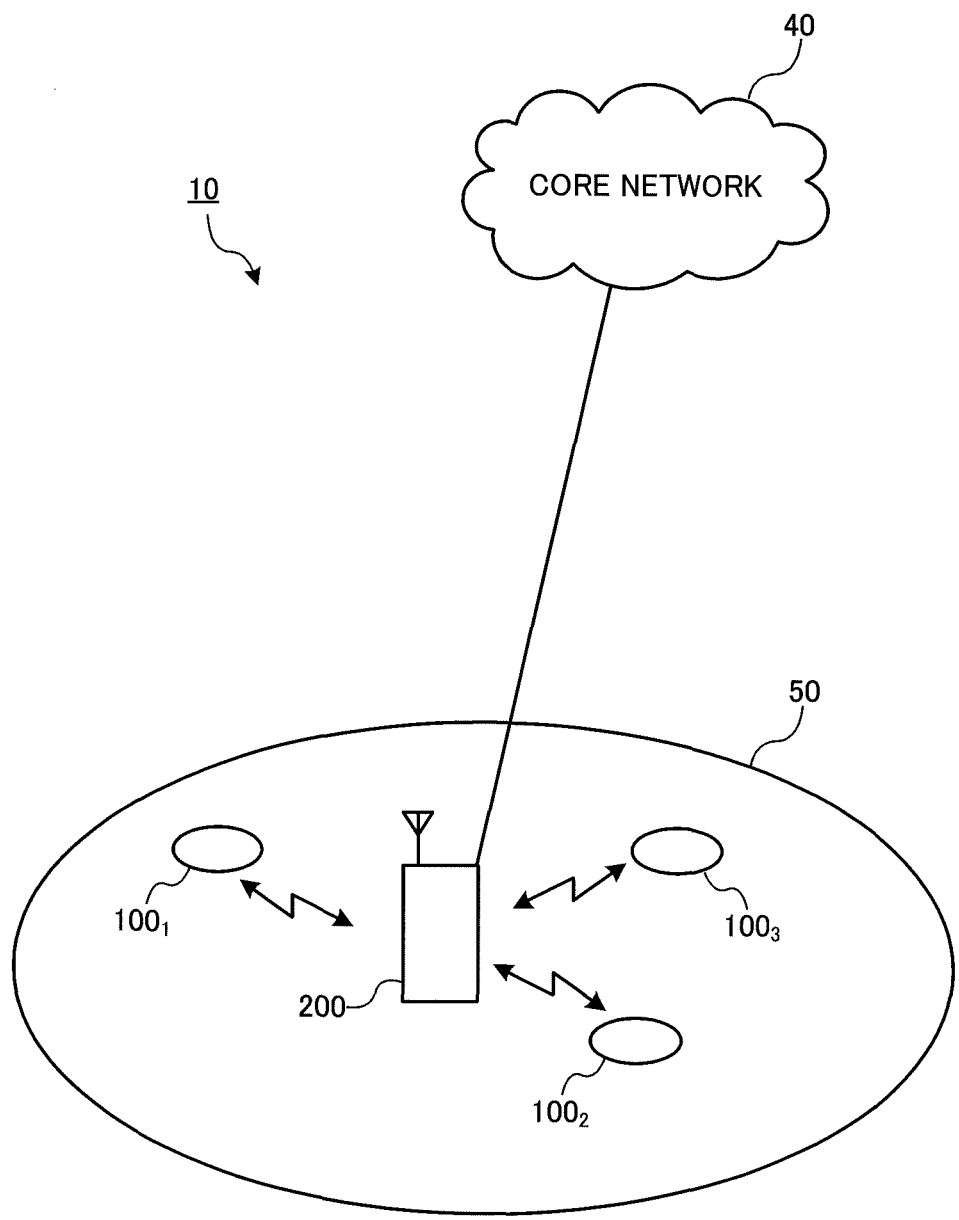
FIG. 9 is a diagram for explaining a configuration of a mobile communication system having a mobile terminal apparatus and a base station apparatus according to the present embodiment.

First, referring to FIG. 9, a mobile communication system 10 having a mobile terminal apparatus 100 and a radio base station apparatus 200 will be described. FIG. 9 is a diagram for explaining the configuration of the mobile communication system 10 having the mobile terminal apparatus 100 and the radio base station apparatus 200 according to the present embodiment. Note that the mobile communication system 10 shown in FIG. 9 is a system to incorporate for example, the LTE system. Also, this mobile communication system 10 may be referred to as "IMT-Advanced system" or "4G."

As illustrated in FIG. 9, the mobile communication system 10 is configured to include a radio base station apparatus 200 and a plurality of mobile terminal apparatuses 100 ($100_1$, $100_2$, $100_3$, . . . $100_n$, where n is an integer to satisfy n>0) that communicate with this radio base station apparatus 200. The radio base station apparatus 200 is connected with a core network 40. The mobile terminal apparatuses 100 communicate with the radio base station apparatus 200 in a cell 50. Note that the core network 40 includes, for example, an access gateway apparatus, a radio network controller (RNC), a mobility management entity (MME) and so on, but this is by no means limiting.

In the mobile communication system 10, as radio access schemes, OFDMA is applied to the downlink and SC-FDMA is applied to the uplink.

OFDMA is a multi-carrier transmission scheme to perform communication by dividing a frequency band into a plurality of narrow frequency bands (subcarriers) and mapping data to each subcarrier. SC-FDMA is a single carrier transmission scheme to perform communication by mapping data to continuous bands, per terminal, and realize multiple-access by allowing a plurality of terminals to use mutually different bands.

Here, the communication channels in the LTE system will be described. As for the downlink, the PDSCH, which transmits traffic data of each mobile terminal apparatus 100, the PDCCH, which reports RB allocation information in the PDSCH, data modulation scheme/channel coding rate, L1/L2 control information such as retransmission-related information, to each mobile terminal apparatus, and so on are used. Also, reference signals to be used in channel estimation, received quality measurement and so on are transmitted together with these channels.

On the uplink, the PUSCH, which transmits traffic data of each mobile terminal apparatus 100, the PUCCH, which transmits channel quality information (CQI) reports for downlink frequency scheduling, and L1/L2 control information such as ACK/NACK in response to downlink transmission data, and so on are used. Also, a demodulation reference signal to be used in channel estimation and a channel quality measurement reference signal to be used in channel quality measurement are transmitted together with these channels.

Next, with reference to FIG. 10, a functional configuration of a mobile terminal apparatus to transmit uplink control information will be described using the above-described mapping tables.

A case will be described in the following description where, when uplink control information is transmitted on the uplink from a mobile terminal apparatus, a plurality of users are orthogonal-multiplexed using cyclic shifts of a CAZAC code sequence, and retransmission acknowledgement signals, which are feedback control information, are transmitted. Note that a case will be shown in the following description where retransmission acknowledgement signals in response to downlink shared channels received from two CCs are defined and transmitted, the number of CCs and feedback control information are by no means limited to these.

Figure 10:
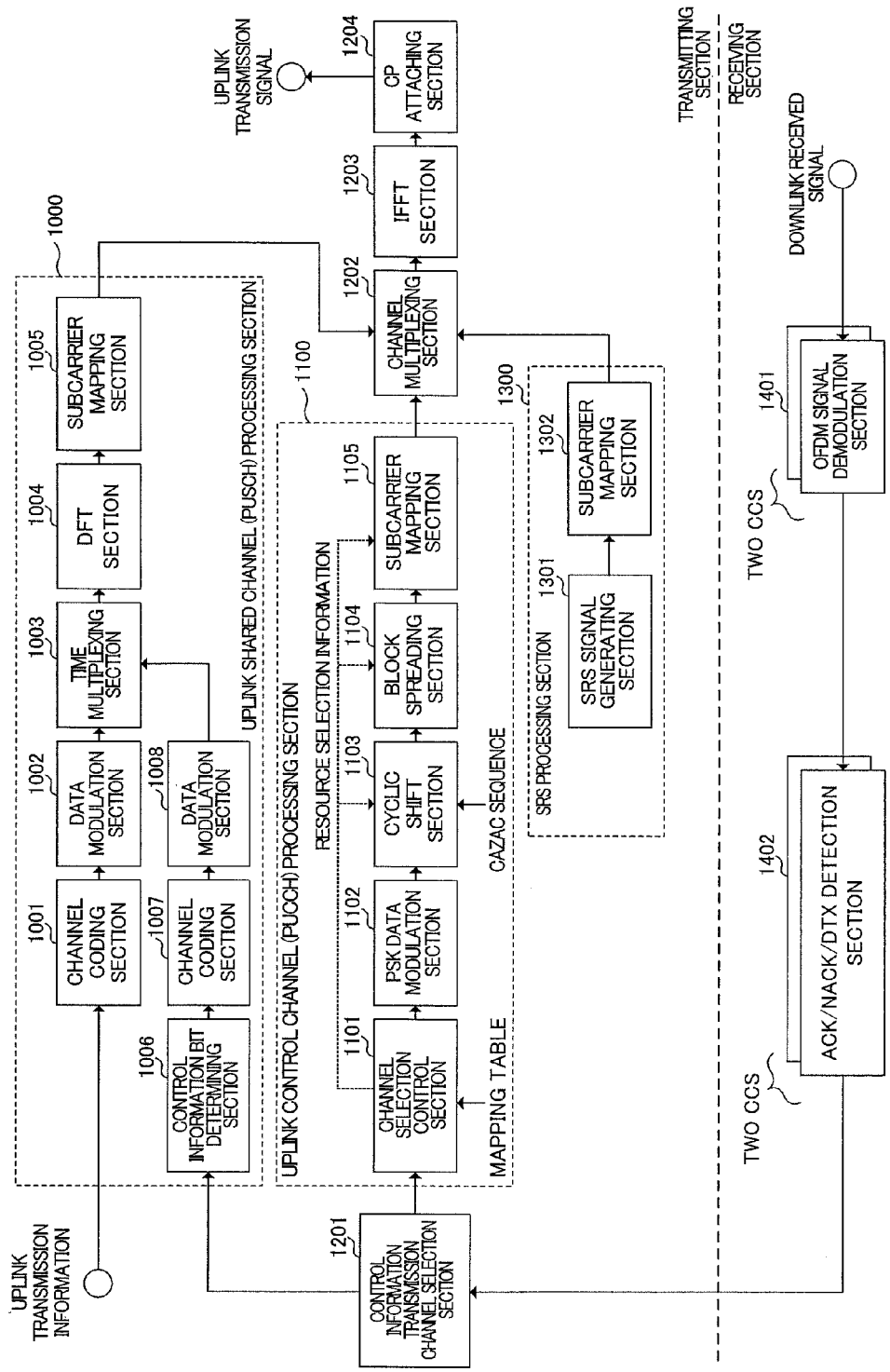
FIG. 10 is a diagram showing a schematic configuration of a mobile terminal apparatus according to an embodiment of the present invention.

The mobile terminal apparatus shown in FIG. 10 has a transmitting section and a receiving section. The receiving section has an OFDM signal demodulation section 1401, which demodulates an OFDM signal, and an ACK/NACK/DTX detection section 1402, which detects ACK/NACK/DTX based on a downlink signal. The transmitting section has a control information transmission channel selection section 1201, an uplink shared channel (PUSCH) processing section 1000, an uplink control channel (PUCCH) processing section 1100, an SRS processing section 1300, a channel multiplexing section 1202, an IFFT section 1203, and a CP attaching section 1204.

The OFDM signal demodulation section 1401 receives and demodulates a downlink OFDM signal. That is to say, the CPs are removed from the downlink OFDM signal, and, by performing a fast Fourier transform, the subcarriers where the BCH signal or the downlink control signal is allocated are extracted, and the data is modulated. When downlink OFDM signals are received from a plurality of CCs, data is demodulated on a per CC basis. The OFDM signal demodulation section 1401 outputs the downlink signal after the data demodulation to the ACK/NACK/DTX detection section 1402.

The ACK/NACK/DTX detection section 1402 determines whether or not the received downlink shared channel signal (PDSCH signal) has been received without error, and outputs each state—ACK when the downlink shared channel signal has been received without error, NACK when error is detected, and DTX when the downlink shared channel signal is not detected —as a detection result. When a plurality of CCs are configured to communication with the radio base station apparatus, whether or not the downlink shared channel signal has been received without error is determined per CC. Also, the ACK/NACK/DTX detection section 1402 detects the above three states on a per codeword basis. Upon two-codeword transmission, the above three states are detected on a per codeword basis. The ACK/NACK/DTX detection section 1402 outputs the detection results to the transmitting section (here, the control information transmission channel selection section 1201).

The control information transmission channel selection section 1201 selects the channel to transmit the retransmission acknowledgement signal, which is feedback control information. To be more specific, the control information transmission channel selection section 1201 determines whether to include and transmit the retransmission acknowledgement signal in the uplink shared channel (PUSCH) or in the uplink control channel (PUCCH). For example, in a subframe upon transmission, when there is a PUSCH signal, the retransmission acknowledgement signal is output to the uplink shared channel processing section 1000, and the retransmission acknowledgement signal is mapped to the PUSCH and transmitted. On the other hand, in the subframe, when there is a PUSCH signal, the retransmission acknowledgement signal is output to the uplink control channel processing section 1100, and the retransmission acknowledgement signal is mapped to the PUCCH and transmitted.

The uplink shared channel processing section 1000 has a control information bit determining section 1006 that determines the bits of the retransmission acknowledgement signal based on the detection result of the ACK/NACK/DTX detection section 1402, a channel coding section 1007 that performs error correction coding of an ACK/NACK bit sequence, a channel coding section 1001 that performs error correction coding of the data sequence to be transmitted, data modulation sections 1002 and 1008 that perform data modulation of the data signal after the coding, a time multiplexing section 1003 that time-multiplexes the modulated data signal and the retransmission acknowledgement signal, a DFT section 1004 that performs an DFT (Discrete Fourier Transform) of the time-multiplexed signal, and a subcarrier mapping section 1005 that maps the signal after the DFT to subcarriers.

The uplink control channel processing section 1100 has a channel selection control section 1101 that controls the allocated resources to use to transmit the retransmission acknowledgement signal and allocation information, a PSK data modulation section 1102 that performs PSK data modulation, a cyclic shift section 1103 that applies a cyclic shift to the data modulated in the PSK data modulation section 1102, a block spreading section 1104 that performs block spreading of the signal after the cyclic shift by a block spreading code, and a subcarrier mapping section 1105 that maps the signal after the block spreading to subcarriers.

The channel selection control section 1101 controls the selection of resources to map to the retransmission acknowledgement signal, based on mapping tables. To be more specific, based on the mapping tables shown in above FIG. 5 to FIG. 8 and FIG. 12 to FIG. 14 and the detection result in the ACK/NACK/DTX detection section 1402, the resources to map bit information are selected, and reported to the PSK data modulation section 1102, the cyclic shift section 1103, the block spreading section 1104 and the subcarrier mapping section 1105.

For example, when the PCC and the SCC are one codeword, the number of allocated resources is two, the state of the PCC is "NACK," the state of the SCC is "ACK," and the mobile terminal apparatus has the mapping table of FIG. 5A, the channel selection control section 1101 reports that the bit information "1" is mapped to Ch 2. Note that the mobile terminal apparatus may be configured to have a plurality of mapping tables and use the plurality of mapping tables depending on predetermined conditions.

Also, the method of determining the number of allocated resources is not particularly limited, and it is possible to use the method of setting in advance, the method of allowing the mobile terminal apparatus to make selections based on the detection result of the ACK/NACK/DTX detection section 1402, the method of determining based on report from the radio communication apparatus and so on. As an example of the method of determining the number of allocated resources, it is possible to determine according to the number of codewords, as described earlier. For example, it is possible to allocate two resources when the PCC and the SCC are both one codeword, allocate three resources when one of the PCC and the SCC is one codeword and the other one is two codewords, and allocate four resources when the PCC and the SCC are both two codewords.

The PSK data modulation section 1102 performs phase shift modulation (PSK data modulation) based information that is reported from the channel selection control section 1101 based on the mapping tables. For example, in the PSK data modulation section 1102, modulation into bit information of two bits by QPSK data modulation is carried out.

The cyclic shift section 1103 performs orthogonal multiplexing using cyclic shift of a CAZAC (Constant Amplitude Zero Auto Correlation) code sequence. To be more specific, a time domain signal is shifted through a predetermined amount of cyclic shift. Note that amount of cyclic shift varies per user, and is associated with the cyclic shift indices. The cyclic shift section 1103 outputs the signal after the cyclic shift to the block spreading section 1104. The block spreading section (orthogonal code multiplication section) 1104 multiples the reference signal after the cyclic shift by an orthogonal code (performs block spreading). Here, the OCC (block spreading code index) to use for the reference signal may be reported from an upper layer by RRC signaling, or it is also possible to use the OCC that is associated with the CS of the data symbol in advance. The block spreading section 1104 outputs the signal after the block spreading to the subcarrier mapping section 1105.

The subcarrier mapping section 1105 maps the signal after the block spreading to subcarriers based on information that is reported from the channel selection control section 1101. Also, the subcarrier mapping section 1105 outputs the mapped signal to the channel multiplexing section 1202.

The SRS processing section 1300 has an SRS signal generating section 1301 that generates an SRS signal (Sounding RS), and a subcarrier mapping section 1302 that maps the generated SRS signal to subcarriers. The subcarrier mapping section 1302 outputs the mapped signal to the channel multiplexing section 1202.

The channel multiplexing section 1202 time-multiplexes the signal from the uplink shared channel processing section 1000 or the uplink control channel processing section 1100, and the reference signal from the SRS signal processing section 1300, and provides a transmission signal to include an uplink control channel signal.

The IFFT section 1203 converts the channel-multiplexed signal into a time domain signal by performing an IFFT. The IFFT section 1203 outputs the signal after the IFFT to the CP attaching section 1204. The CP attaching section 1204 attaches CPs to the signal after the orthogonal code multiplication. Then, an uplink transmission signal is transmitted to the radio communication apparatus using the uplink channel of a specific CC.

Next, with reference to FIG. 11, the functional configuration of a radio base station apparatus that receives uplink control information that is transmitted from the mobile terminal apparatus shown in above FIG. 10 will be described.

Figure 11:
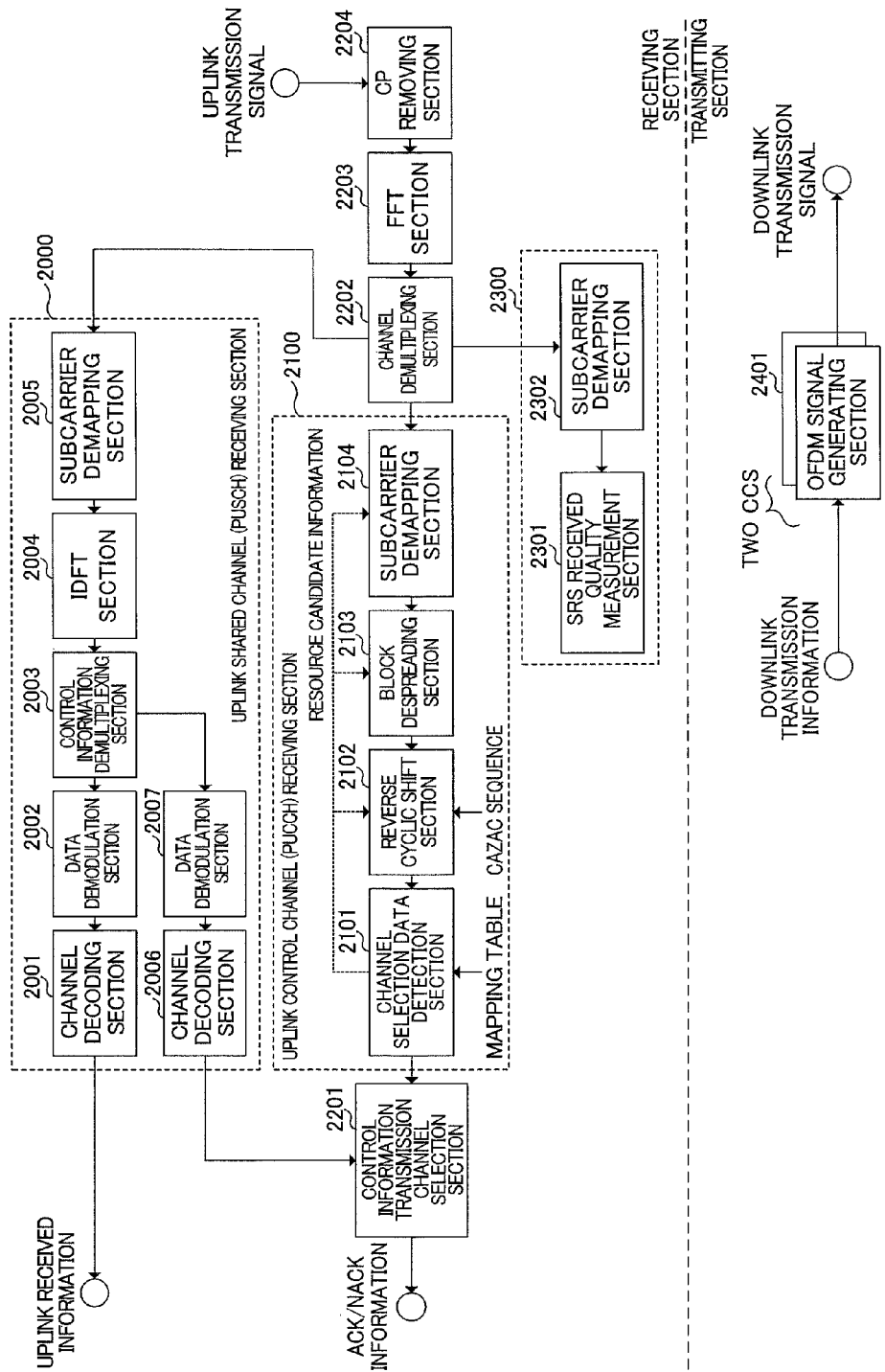
FIG. 11 is a diagram illustrating a schematic configuration of a radio base station apparatus according to an embodiment of the present invention.

The mobile terminal apparatus shown in FIG. 11 has a transmitting section and a receiving section. The transmitting section has an OFDM signal generating section 2401 that generates OFDM signals for each of a plurality of CCs. The OFDM signal generating section 2401 generates a downlink transmission signal by mapping a downlink signal including other downlink channel signals and an uplink resource allocation information signal to subcarriers, performing an inverse fast Fourier transform (IFFT) and attaching CPs.

The receiving section has a CP removing section 2204 that removes the CPs from a received signal, an FFT section 2203 that performs a fast Fourier transform (FFT) of the received signal, a channel demultiplexing section 2202 that demultiplexes the multiplexed signal (the PUSCH signal, the PUCCH signal and the SRS signal), an uplink shared channel (PUSCH) receiving section 2000 that processes the signal after the channel demultiplexing, an uplink control channel (PUCCH) receiving section 2100, and an SRS signal receiving section 2300.

The uplink shared channel receiving section 2000 has a subcarrier demapping section 2005 that demaps the signal after the channel demultiplexing, an IDFT section 2004 that performs an IDFT (Inverse Discrete Fourier Transform) of the signal after the subcarrier demapping, a control information demultiplexing section 2003 that demultiplexes the data signal and the control signal after the IDFT, data demodulation sections 2002 and 2007 that demodulate the demultiplexed data signal and control signal, respectively, and channel decoding sections 2001 and 2006 that perform channel decoding of the signal after the data demodulation.

The uplink control channel receiving section 2100 has a subcarrier demapping section 2104 that demaps the signal after the channel demultiplexing, a block despreading section 2103 that despreads the signal after the subcarrier demapping by a block spreading code (OCC), a cyclic shift demultiplexing section 2102 that demultiplexes the signal of the target user by removing the cyclic shift from the despread signal, and a channel selection data detection section 2101 that controls resource candidate information based on mapping tables.

The channel selection data detection section 2101 reports candidate information of the retransmission acknowledgement signals to the subcarrier demapping section 2104, the block despreading section 2103, and the cyclic shift demultiplexing section 2102, based on the mapping tables, and also detects the retransmission acknowledgement information of each CC. The mapping tables of the base station apparatus may be common with the mapping table of the mobile terminal apparatus.

The control information transmission channel selection section 2201 detects the channel that is used to transmit the retransmission acknowledgement signals, which are feedback control information, and controls switching of output from the uplink shared channel receiving section 2000 or the uplink control channel receiving section 2100. When retransmission acknowledgement signals are included in the PUSCH and transmitted, information that is output from the uplink shared channel receiving section 2000 is output as retransmission acknowledgement signals. Also, when retransmission acknowledgement signals are transmitted in the PUCCH, information that is output from the uplink control channel receiving section 2100 is output as retransmission acknowledgement signals.

The SRS signal receiving section 2300 has a subcarrier demapping section 2302 that demaps the SRS signal after the channel demultiplexing, and an SRS received quality measurement section 2301 that measures the received quality of the SRS signal after the subcarrier demapping.

The number of processing parts and the steps of processing in the above descriptions may be implemented with appropriate changes, without departing from the scope of the present invention. Also, the elements illustrated in the drawings show functions, and each function block may be realized by hardware or may be realized by software. Besides, the present invention can be implemented with various changes, without departing from the scope of the present invention.

The disclosures of Japanese Patent Application No. 2010-181944, filed on Aug. 16, 2010, and Japanese Patent Application No. 2010-225117, filed on Oct. 4, 2010, including the specifications, drawings, and abstracts, are incorporated herein by reference in their entirety.

The invention claimed is:

1. A mobile terminal apparatus that performs radio communication in a system band that is formed with a plurality of component carriers, the mobile terminal apparatus comprising:
   a processor and a transmitter;
   a demodulator executed by the processor that demodulates downlink shared channel signals for the respective component carriers;

a detector executed by the processor that detects a state of each of retransmission acknowledgement signals of the respective component carriers based on the demodulated downlink shared channel signals; and an uplink control channel processor executed by the processor that maps the retransmission acknowledgement signals of the component carriers to an uplink control channel of a specific component carrier that is selected from the plurality of component carriers and the transmitter transmits the retransmission acknowledgment signals, wherein the uplink control channel processor performs mapping based on a mapping table in which states of the retransmission acknowledgement signals of the component carriers are defined by bit information by phase shift modulation and selection information among a plurality of allocated resources for the uplink control channel, and in the mapping table, when a Primary Component Carrier (PCC) and a Secondary Component Carrier (SCC) of the plurality of component carriers are subject to one-codeword transmission, the number of allocated resources for the Physical Uplink Control Channel (PUCCH) is set to two, and ACK, NACK, and DTX which are states of a retransmission acknowledgement signal of the PCC are defined separately and DTX which is a state of a retransmission acknowledgement signal of the SCC is not defined separately, a state of the retransmission acknowledgement signal of the SCC indicating DTX and NACK is defined in a first allocated resource of the allocated resources for PUCCH transmission and a state of the retransmission acknowledgement signal of the SCC indicating ACK is defined in a second allocated resource of the allocated resources for PUCCH transmission.

2. A mobile terminal apparatus according to claim 1, wherein, in the mapping table, the PCC is gathering retransmission acknowledgement signals of the plurality of component carriers.

3. A radio communication method of performing radio communication in a system band that is formed with a plurality of component carriers, the radio communication method comprising the steps of:

in a mobile terminal apparatus, receiving and demodulating downlink shared channel signals for the respective component carriers, transmitted from a radio base station apparatus;

detecting a state of each of retransmission acknowledgement signals of the respective component carriers based on the demodulated downlink shared channel signals; and mapping the retransmission acknowledgement signals of the component carriers to an uplink control channel of a specific component carrier that is selected from the plurality of component carriers and transmitting the retransmission acknowledgment signals, wherein the mobile terminal apparatus performs mapping based on a mapping table in which states of the retransmission acknowledgement signals of the component carriers are defined by bit information by phase shift modulation and selection information among a plurality of allocated resources for the uplink control channel, and in the mapping table, when a Primary Component Carrier (PCC) and a Secondary Component Carrier (SCC) of the plurality of component carriers are subject to one-codeword transmission, the number of allocated resources for the Physical Uplink Control Channel (PUCCH) is set to two, and ACK, NACK, and DTX which are states of a retransmission acknowledgement signal of the PCC are defined separately and DTX which is a state of a retransmission acknowledgement signal of the SCC is not defined separately, a state of the retransmission acknowledgement signal of the SCC indicating DTX and NACK is defined in a first allocated resource of the allocated resources for PUCCH transmission and a state of the retransmission acknowledgement signal of the SCC indicating ACK is defined in a second allocated resource of the allocated resources for PUCCH transmission.

4. A radio communication system in which a radio base station apparatus and a mobile terminal apparatus perform radio communication using a system band that is formed with a plurality of component carriers, the radio communication system comprising:

the radio base station apparatus transmitting downlink shared channel signals in the respective component carriers; and the mobile terminal apparatus mapping retransmission acknowledgement signals in response to reception of the downlink shared channel signals in the component carriers, to an uplink control channel of a specific component carrier based on a mapping table, and transmitting the retransmission acknowledgement signals, wherein, in the mapping table, states of the retransmission acknowledgement signals of the component carriers are defined by bit information by phase shift modulation and selection information among a plurality of allocated resources for the uplink control channel, and when the component carriers are configured with a Primary Component Carrier (PCC) and a Secondary Component Carrier (SCC) both subjected to one-codeword transmission, the number of allocated resources for the Physical Uplink Control Channel (PUCCH) is set to two, and ACK, NACK and DTX of a retransmission acknowledgement signal of the PCC are defined separately and DTX of a retransmission acknowledgement signal of the SCC is not defined separately, a state of the retransmission acknowledgement signal of the SCC indicating DTX and NACK is defined in a first allocated resource of the allocated resources for PUCCH transmission and a state of the retransmission acknowledgement signal of the SCC indicating ACK is defined in a second allocated resource of the allocated resources for PUCCH transmission.

* * * * *

UNITED STATES PATENT AND TRADEMARK OFFICE
CERTIFICATE OF CORRECTION

PATENT NO. : 10,009,875 B2
APPLICATION NO. : 13/816743
DATED : June 26, 2018
INVENTOR(S) : Kishiyama et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 550 days.

Signed and Sealed this
Eighteenth Day of December, 2018

Andrei Iancu
*Director of the United States Patent and Trademark Office*